US006956524B2

(12) United States Patent

Tucker et al.

(10) Patent No.: US 6,956,524 B2

(45) Date of Patent: *Oct. 18, 2005

(54) METHOD OF DYNAMICALLY TRACKING A LOCATION OF ONE OR MORE SELECTED UTILITIES

(75) Inventors: Layne Daniel Tucker, Grand Prairie (CA); Peter William Lylick, St. Albert (CA)

(73) Assignee: Global Precision Solutions, LLP, Grand Junction, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/951,288

(22) Filed: Sep. 27, 2004

(65) Prior Publication Data

US 2005/0104775 A1 May 19, 2005

Related U.S. Application Data

(63) Continuation of application No. 10/358,429, filed on Feb. 3, 2003, now Pat. No. 6,798,379.

(51) Int. Cl.$^{7}$ .......................... H04B 7/185; G06F 19/00

(52) U.S. Cl. ............................ 342/357.13; 342/357.08; 701/50

(58) Field of Search ........................ 342/357.13, 357.08, 342/357.17; 701/50; 340/539.13

(56) References Cited

U.S. PATENT DOCUMENTS 6,710,741 B2 * 3/2004 Tucker .................. 342/357.17

6,798,379 B2 * 9/2004 Tucker et al. .......... 342/357.13

* cited by examiner

*Primary Examiner*—Thomas H. Tarcza

*Assistant Examiner*—F H Mull

(74) *Attorney, Agent, or Firm*—Christie, Parker & Hale, LLP.

(57) ABSTRACT

A method of dynamically tracking a location of one or more selected utilities. A first step involves providing a portable controller having a memory. A global positioning system (GPS) co-ordinate device and a display are coupled to the controller. A second step involves storing in the memory of the controller a series of GPS co-ordinates for the one or more selected utilities within an assigned service area of a municipality. A third step involves using the GPS co-ordinate device to dynamically provide GPS co-ordinates to the controller as positioning of the GPS co-ordinate device changes. A fourth step involves using the display to display the GPS co-ordinates of the GPS co-ordinate device on a scrolling display of GPS co-ordinates, together with the series of GPS co-ordinates for the one or more selected utilities, such that the relative position of the GPS co-ordinate device to the one or more selected utilities is always known.

20 Claims, 3 Drawing Sheets

METHOD OF DYNAMICALLY TRACKING A LOCATION OF ONE OR MORE SELECTED UTILITIES

CROSS-REFERENCE TO RELATED APPLICATION(S)

This application is a continuation of U.S. patent application Ser. No. 10/358,429, now issued as U.S. Pat. No. 6,798,379, filed Feb. 3, 2003, the entire content of which is hereby incorporated by reference.

FIELD OF THE INVENTION

The present invention relates to a method of dynamically tracking a location of one or more selected utilities.

BACKGROUND OF THE INVENTION

Systems have been developed for locating utilities below ground at excavation sites and monitoring activities of earth working equipment at such sites. Examples of such systems are described in U.S. Pat. No. 5,198,800 (Tozawa et al 1993); U.S. Pat. No. 5,964,298 (Greenspun 1999); U.S. Pat. No. 6,119,376 (Stump 2000) and U.S. Pat. No. 6,282,477 (Gudat 2001). These systems are site specific.

When emergency response crews respond to a call there is a need for access to information regarding the proximity of utilities. For example, in the event of a fire, knowledge as to the proximity of high pressure gas lines or power lines is crucial. Equally important is knowledge as to the closest fire hydrant for supplying water to fight the fire. The situation rarely remains static. Depending upon wind conditions and fuel sources, the fire may rapidly progress in one of several directions. When this occurs, it is important that the emergency response crew be able to continually update information as to the presence of utilities in the path of the fire.

SUMMARY OF THE INVENTION

What is required is a method of dynamically tracking a location of one or more selected utilities as a movement occurs within a municipal service area.

According to the present invention there is provided a method of dynamically tracking a location of one or more selected utilities. A first step involves providing a portable controller having a memory. A global positioning system (GPS) co-ordinate device and a display are coupled to the controller. A second step involves storing in the memory of the controller a series of GPS co-ordinates for the one or more selected utilities within an assigned service area of a municipality. A third step involves using the GPS co-ordinate device to dynamically provide GPS co-ordinates to the controller as positioning of the GPS co-ordinate device changes. A fourth step involves using the display to display the GPS co-ordinates of the GPS co-ordinate device on a scrolling display of GPS co-ordinates, together with the series of GPS co-ordinates for the one or more selected utilities, such that the relative position of the GPS co-ordinate device to the one or more selected utilities is always known.

With the method, as described above, as the GPS co-ordinate device is moved along a path, the display scrolls to reflect movement of the GPS co-ordinate device and display GPS co-ordinates for any portion of the selected utilities which the path of the GPS co-ordinate device will cross.

Once the basic teachings of the method are understood, there are various features which can be added as further enhancements to the system.

Even more beneficial results may be obtained when the display indicates a direction from the GPS co-ordinate device to known utilities. This can be done in various ways. One effective way is to graphically display a target on which is marked compass directions and utilities.

Even more beneficial results may be obtained when the display indicates a specified distance from the GPS co-ordinate device to a closest of the selected utilities.

Even more beneficial results may be obtained when the display indicates the longitude, the latitude and the speed of travel of the GPS co-ordinate device.

Even more beneficial results may be obtained when the display places the GPS co-ordinates in the context of a geographical map. It is preferred that the geographical map includes road infrastructure. Beneficial results have been obtained through the use of an aerial photo.

Even more beneficial results may be obtained when the display provides vital data identifying characteristics of the closest of the selected utilities.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method of dynamically tracking a location of one or more selected utilities as a movement occurs within a municipal service area will now be described with reference to FIGS. 1 through 3.

Figure 1:
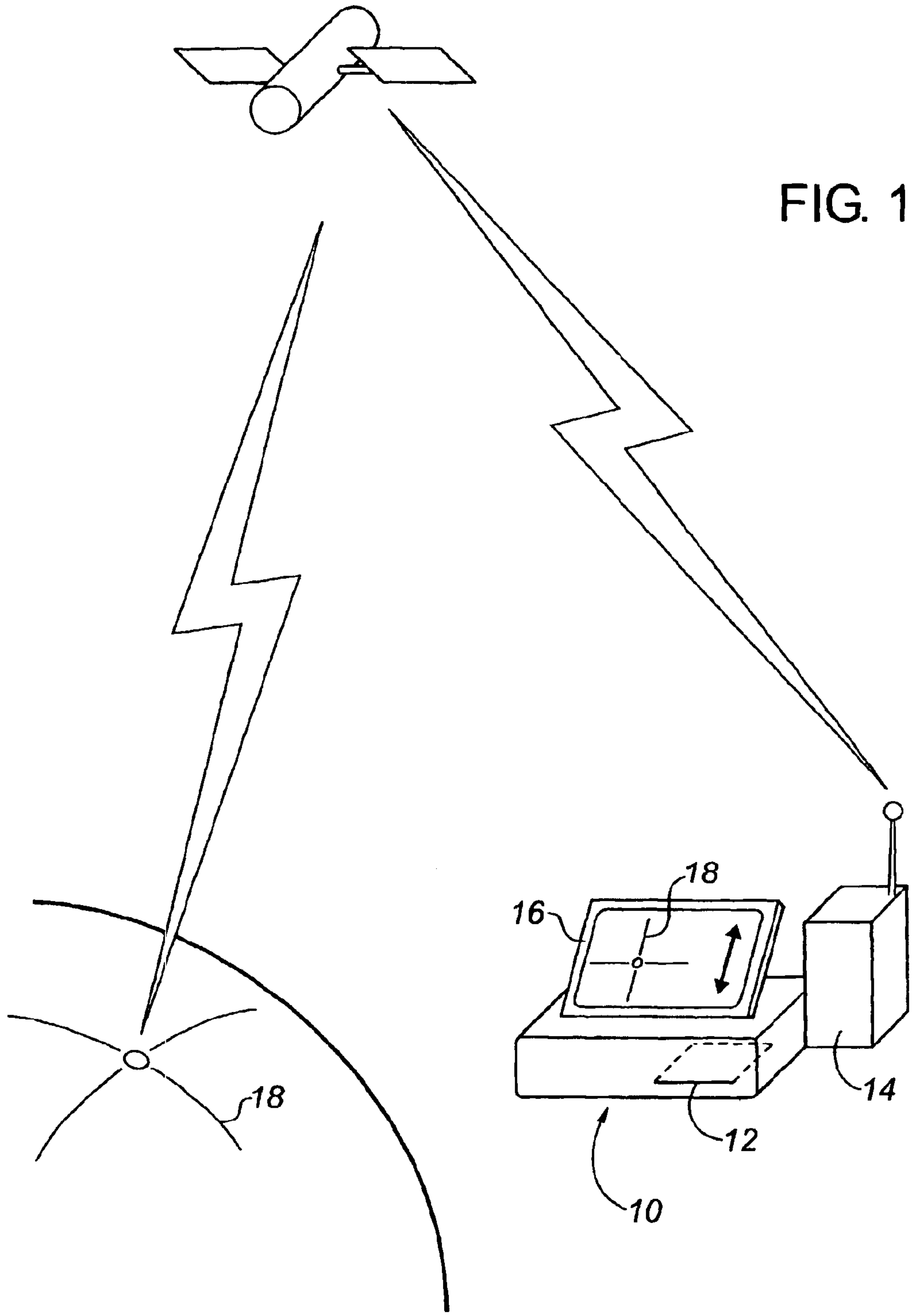
FIG. 1 is a perspective view of system components used in accordance with the teachings of the method of dynamically tracking a location of one or more selected utilities as a movement occurs within a municipal service area.

Referring to FIG. 1, a first step involves: providing a portable controller, generally indicated by reference numeral 10. Controller 10 has a memory 12 and a global positioning system (GPS) co-ordinate device 14. A scrolling display 16 is also coupled to controller 10.

Figure 2:
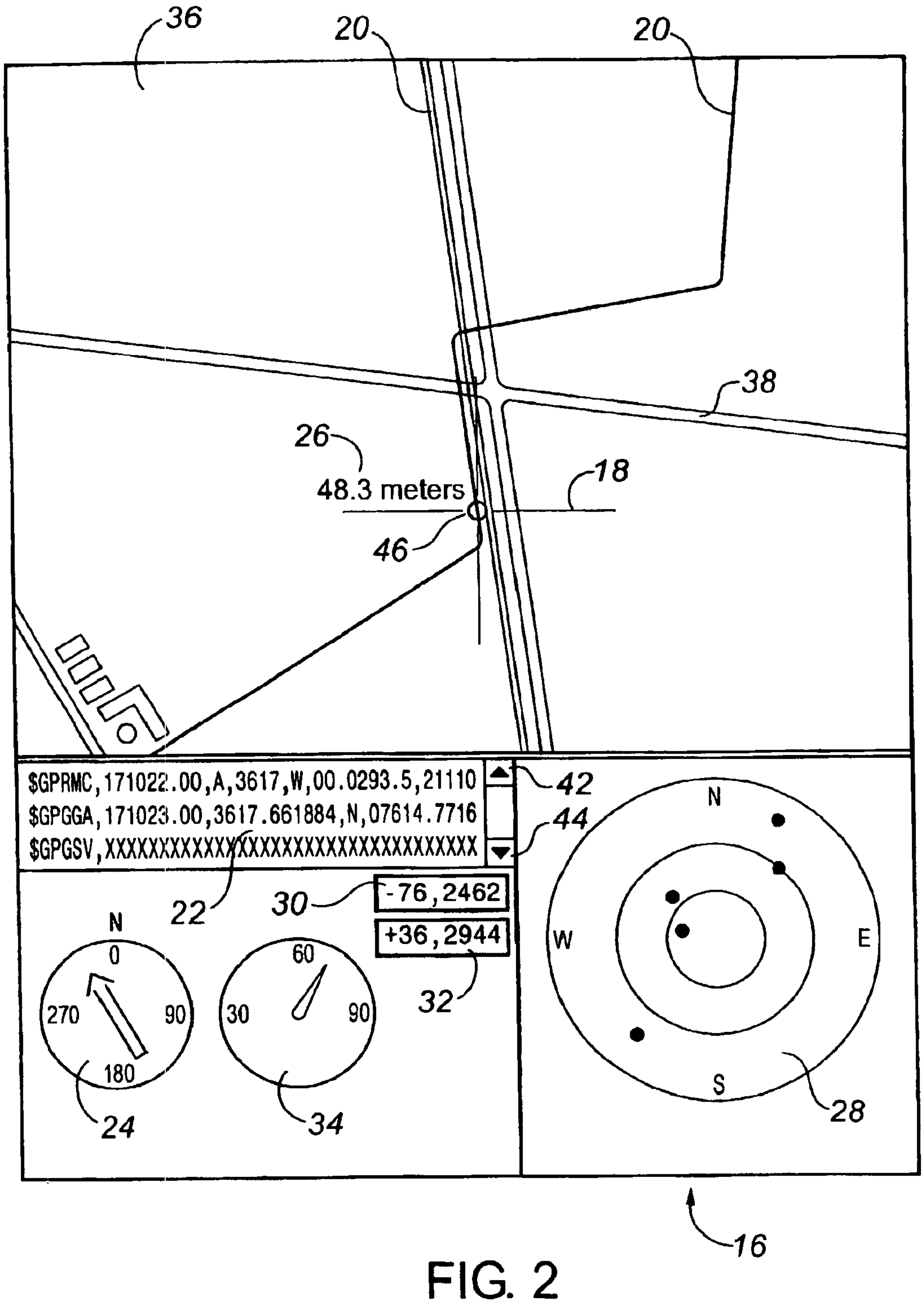
FIG. 2 is a first detailed front elevation view of a display configured in accordance with the teachings of the present invention.

Referring to FIG. 1, a second step involves storing in memory 12 a series of GPS co-ordinates 18 for one or more selected utilities 20 within an assigned service area of a municipality as shown in FIG. 2.

Referring to FIG. 1, a third step involves: using GPS co-ordinate device 14 to dynamically provide GPS co-ordinates 18 to controller 10 as positioning of GPS co-ordinate device 14 changes location.

Referring to FIG. 2, a fourth step involves: using scrolling display 16 to display GPS co-ordinates of GPS co-ordinate device 14 on a display 22 of global positioning system co-ordinates, together with a series of GPS co-ordinates 18 for one or more of selected utilities 20, such that the relative position of GPS co-ordinate device 14 to one or more selected utilities 18 is always known.

Referring to FIG. 2, scrolling display 16 has a graphic indicator 24 which indicates a direction of travel for GPS co-ordinate device 14. There is also displayed a numeric indicator 26 which indicates the distance in the direction of travel before GPS co-ordinate device 14 encounters the closest of selected utilities 20. There is also a graphic indicator 28 depicting a target, which graphically indicates the positioning of satellites available to GPS co-ordinate device 14.

Referring to FIG. 2, scrolling display 16 has a numeric indicator 30', which indicates longitude, and a numeric indicator 32, which indicates latitude 32. Display also has a graphic indicator 34, which indicates speed of travel 34 of GPS co-ordinate device 14. Of course, when emergency crews are on foot the speed will be negligible. However, when the emergency crews are travelling in a vehicle, the speed of the vehicle will be indicated.

Referring to FIG. 2, scrolling display 16 places GPS co-ordinates 18 in the context of a geographical map 36 with road infrastructure 38. It is preferred that geographical map 36 may be in the form of an aerial photo.

Figure 3:
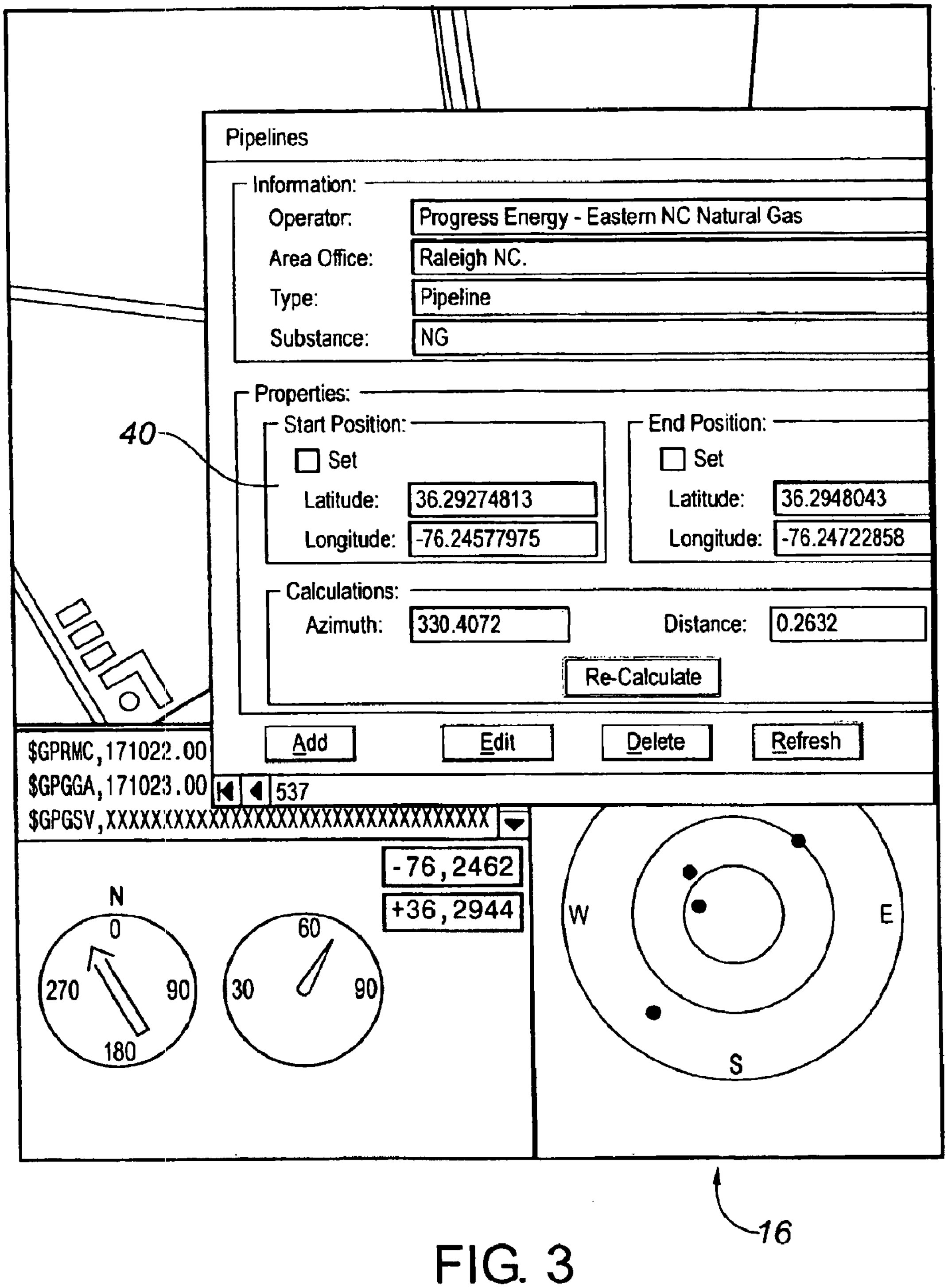
FIG. 3 is a second detailed front elevation view of a display configured in accordance with the teachings of the present invention.

Referring to FIG. 3, scrolling display 16 has a pop-up display screen 40 which provides vital data identifying characteristics of the closest of selected utilities 20. In the illustrated example, the utility identified is a natural gas pipeline owned by Process Energy-Eastern North Carolina Natural Gas, serviced out of a contact office in Raleigh, N.C.

An important aspect of the present invention is the dynamic nature of scrolling display 16, which scrolls as the GPS co-ordinates of GPS co-ordinate device 14 change. This scrolling aspect is particularly apparent when the emergency crew is approaching a site in a vehicle. The system continuously scans the GPS data it receives: firstly, to ascertain the position of GPS co-ordinate device 14 and secondly, for relative co-ordinates of utility hazards. All of the displays continually scroll and update the data with movement of GPS co-ordinate device 14. When one gets within a pre-determined area of interest, a circular icon 46 appears on scrolling display 16 and locks onto the closest utility to show the point at which GPS co-ordinate device 14 will cross the utility if it continues in the same direction.

Referring to FIG. 2, scrolling display 16 may also be manually scrolled using an on screen up arrow 42 or an on screen down arrow 44, to enable the emergency crew to manually look ahead, without changing their position.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

What is claimed is:

1. A system of dynamically tracking a location of one or more selected utilities, the system comprising:

a controller having a memory for storing a series of global positioning system (GPS) co-ordinates for the selected utilities within an assigned service area of a municipality;

a display coupled to the controller and for displaying an icon; and a GPS co-ordinate device coupled to the display via the controller;

wherein the GPS co-ordinate device dynamically provides its GPS co-ordinates to the controller as positioning of the GPS co-ordinate device changes location, such that the relative position of the GPS co-ordinate device to the selected utilities is always known; and wherein the icon is locked on to a closest of the selected utilities within a pre-determined area of interest.

2. The system of claim 1, wherein the display comprises a scrolling display for displaying the GPS co-ordinates of the GPS co-ordinate device together with the series of GPS co-ordinates for the selected utilities.

3. The system of claim 1, wherein the display specifies a distance from the GPS co-ordinate device to the closest of the selected utilities.

4. The system of claim 1, wherein the display indicates a direction from the GPS co-ordinate device to known utilities.

5. The system of claim 1, wherein the display indicates the longitude, the latitude and the speed of travel of the GPS co-ordinate device.

6. The system of claim 1, further comprising a geographical map having a context, wherein the display places the GPS co-ordinates in the context of the geographical map.

7. The system of claim 6, wherein the geographical map includes a road infrastructure.

8. The system of claim 6, wherein the geographical map is an aerial photo.

9. The system of claim 1, wherein the display provides vital data identifying characteristics of the closest of the selected utilities.

10. A system of dynamically tracking a location of one or more selected utilities, the system comprising:

means for storing a series of global positioning system (GPS) co-ordinates for the selected utilities within an assigned service area of a municipality in a memory of a controller;

means for dynamically providing GPS co-ordinates of a GPS co-ordinate device to the controller as positioning of the GPS co-ordinate device changes location, such that the relative position of the GPS co-ordinate device to the one or more selected utilities is always known;

means for locking on to a closest of the selected utilities within a pre-determined area of interest; and means for specifying a distance from the GPS co-ordinate device to the closest of the selected utilities.

11. The system of claim 10, further comprising means for displaying the GPS co-ordinates of the GPS co-ordinate device in a scrolling manner together with the series of GPS co-ordinates for the selected utilities.

12. The system of claim 10, further comprising means for displaying the location of the controller relative to the closest of the selected utilities.

13. The system of claim 10, further comprising means for indicating a direction from the GPS co-ordinate device to known utilities.

14. The system of claim 10, further comprising means for indicating the longitude, the latitude and the speed of travel of the GPS co-ordinate device.

15. The system of claim 10, further comprising:

a geographical map having a context; and means for placing the GPS co-ordinates in the context of the geographical map.

16. The system of claim 15, wherein the geographical map includes road infrastructure.

17. The system of claim 15, wherein the geographical map is an aerial photo.

18. The system of claim 10, further comprising means for providing vital data identifying characteristics of the closest of the selected utilities.

19. A method of dynamically tracking a location of one or more selected utilities, the method comprising:

storing a series of global positioning system (GPS) co-ordinates for the one or more selected utilities within an assigned service area of a municipality in a memory of a controller;

dynamically providing GPS co-ordinates to the controller as positioning of a GPS co-ordinate device coupled to the controller changes location;

displaying the GPS co-ordinates of the GPS co-ordinate device on a scrolling display, together with the series of GPS co-ordinates for the one or more selected utilities, such that the relative position of the GPS co-ordinate device to the one or more selected utilities is always known; and locking on to a closest of the selected utilities within the pre-determined area of interest.

20. The method of claim 19, further comprising:

specifying a distance from the GPS co-ordinate device to the closest of the selected utilities.

* * * * *